United States Patent Office 3,764,358
Patented Oct. 9, 1973

3,764,358
SPERM OIL SUBSTITUTE AND ITS USE IN LEATHER TREATMENT
John G. Papalos, Kearny, and Clinton E. Retzsch, Caldwell, N.J., assignors to Diamond Shamrock Corporation, Cleveland, Ohio
No Drawing. Filed Oct. 18, 1971, Ser. No. 190,278
Int. Cl. C08h 9/00, 17/26
U.S. Cl. 106—249           8 Claims

ABSTRACT OF THE DISCLOSURE

A substitute for sperm oil is prepared consisting of a blend of esters with unsaturated oils. This blend may then be sulfated. The sulfated blend has utility in leather treatment.

BACKGROUND OF THE INVENTION

(1) Field of the invention

This invention relates to sulfated and unsulfated blends of fatty acid esters with unsaturated oils and the use of the sulfated blends in leather treatment.

(2) Description of the prior art

Whale oil, and in particular sperm oil, has been used in industrial processing for many years. However in December 1970 the Department of the Interior of the United States of America classified whales as endangered species, as a result of which sperm oil is no longer available in the United States in commercial quantities. Similar measures were taken by a majority of the nations which engaged in whaling. This has given rise to the need for a substitute for sperm oil. An exact duplication of natural sperm oil is not practical, as it contains a broad range of esters of saturated and unsaturated fatty acids with saturated and unsaturated alcohols, glycerides of saturated and unsaturated acids, and at least one sterol. Various attempts at duplicating selected components of sperm oil for specific uses have also not been successful, both because it is difficult to determine exactly which components are required and because the cost of such a duplication is prohibitively high.

SUMMARY OF THE INVENTION

The sperm oil substitute of this invention consists of an ester (which is the reaction product of a $C_{2-30}$ alcohol and a $C_{2-28}$ fatty acid), blended with unsaturated oil. This blend may then be sulfated, or the ester may be sulfated by itself. The sulfated blend is particularly useful as a treating agent for leather, replacing sulfated natural sperm oil in the fat-liquoring process.

DESCRIPTION OF THE PREFERRED EMBODIMENTS

Preparation of the esters

The esters of this invention may be prepared by any conventional esterification method, of which the method of Example I is exemplary and preferred.

Example I (1) A reaction kettle in which a nitrogen atmosphere was maintained was charged with the following ingredients (all quantities are parts by weight):

| | Parts |
|---|---|
| Alcohol | 58.0 |
| Fatty acid | 44.5 |
| Methane sulfonic acid (70% min.) | 0.5 |
| Hypophosphorous acid | 0.2 |

(2) The pressure in the reaction kettle was adjusted to 100 mm. and the contents were heated slowly to 135–140° C. A condensing apparatus was attached so as to collect all of the distillates evaporating from the kettle.

(3) The distillate was separated and the top layer was returned to the kettle. This was repeated until about 3.2 parts of water were collected, or until no further separation occurred. The water was discarded.

(4) The reaction was continued at 140–150° C. and a pressure of 25 mm. for 2 hours. The reaction mass was then cooled to 70° C. and the acid value was determined in accordance with A.S.T.M. Test No. D–500–45. The desired acid value was <5.0, and if a greater acid value was obtained, heating was resumed at 140–150° C. and 25 mm. pressure, until the desired acid value was reached.

(5) After the desired acid value was reached, 5.7 parts of sodium bicarbonate (U.S.P., 10% sol.) were added to the reaction mass which was then heated at a temperature no higher than 150° C. and about 5.0 parts of water were stripped at a pressure of 25 mm.

(6) The reaction mass was then cooled to 100° C. and the vacuum was broken with nitrogen. About 1.0 part of a filter aid cell and about 1.0 part of a basic clay were then added and the mixture was held at a temperature of 100–110° C. for 1 hour under a nitrogen blanket.

(7) The mixture was then filtered at 30–40° C. so as to remove the filter acid cell and clay, yielding about 99–100 parts of an alcohol ester.

The fatty acids of use in this invention are those having a backbone of from 2 to 28 carbon atoms and may be saturated or unsaturated; branched or linear; substituted or unsubstituted; and mono- or di-carboxylic.

Examples of useful fatty acids include, but are not limited to: saturated fatty acids such as butyric, caproic, enanthylic, caprylic, pelargonic, capric, lauric, myristic, palmitic, stearic, arachidic, behenic, lignoceric, cerotic, and montanic; unsaturated fatty acids having one double bond such as caproleic, myristoleic, palmitoleic, petroselinic, oleic, raccenic, gadoleic, gondoic, cetoleic, erucic, selacholeic, and ximenic; unsaturated fatty acids having two double bonds such as stillingic, linoleic, 11,14-eicosadienoic, and 13,16-docosadienoic; unsaturated fatty acids having three double bonds such as hiragonic, 6,9,12-octadecatrienoic, linolenic, 5,8,11-eicosatrienoic, 8,11,14-eicosatrienoic, and 7,10,13-docosatrienoic; unsaturated fatty acids having four or more double bonds such as 4,8,11,14 - hexadecatetraenoic, 6,9,12,15 - hexadecatetraenoic, moroctic, arachidonic, clupanodonic, and nisinic; unsaturated fatty acids having conjugated double bonds such as alpha-eleostearic, alpha-punicic, alpha-kamlolenic, alpha-licanic, and alpha-parinaric; substituted unsaturated fatty acids having a hydroxy or epoxy group such as ricinoleic, 2-hydroxy-12-octadecenoic, and vernolic; unsaturated fatty acids having a triple bond or a triple bond and a double bond such as tariric, ximenynic (santalbic), and isanic (erythrogenic); branched chain fatty acids such as isobutyric, isovaleric, pivalic, tuberculostearic, hydnocarpic, chaulmoogric, and gorlic; dicarboxylic fatty acids such as oxalic, malonic, succinic, glutaric, adipic, pimelic, suberic, azelaic, sebacic, fumaric, itaconic, citraconic, maleic, and dimer acids, mixtures of fatty acids derived from oils such as tall oil fatty acids, castor oil fatty acids, rosin oil fatty acids; and mixtures of any of the above.

Preferred fatty acids have a backbone of from 6 to 22 carbon atoms, are unsaturated, and are monocarboxylic. Examples of preferred fatty acids include, but are not limited to: caprylic, pelargonic, capric, lauric, myristic, palmitic, stearic, arachidic, behenic, caproleic, myristoleic, palmitoleic, oleic, gadoleic, gondoric, cetoleic, linoleic, linolenic, ricinoleic, tall oil fatty acids, castor oil fatty acids, rosin oil fatty acids, and mixtures of any of the above.

Alcohols used in the preparation of the ester may be any aliphatic alcohol having from 2 to 30 carbon atoms in its backbone and may be: saturated or unsaturated;

branched or linear; monohydric or dihydric; and primary, secondary, or tertiary. Examples of useful alcohols include ethyl, propyl, butyl, amyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl, nonacosyl, and triacontyl, the corresponding secondary and tertiary alcohols, their isomers, their analagous mono- and polyunsaturates, their glycols, their mixtures and the like. Useful alcohols include those produced by hydrogenation of fatty acids or glycerides obtained from animal or vegetable oils and waxes such as coconut oil, castor oil, tall oil, tallow oil or the like. Other alcohols can be produced by the Oxo process. This process involves catalytic reaction of alpha-olefins with carbon monoxide and hydrogen under pressure to obtain primary aliphatic alcohols having branched chains. Oxo alcohols include i-octyl, decyl, tridecy, pentadecyl, their mixtures and the like. Other primary aliphatic alcohols include those produce by the polymerization of ethylene with Ziegler type catalysts and subsequent reaction of the metal alkyls formed in this polymerization to obtain mixtures of straight chain primary alcohols. These alcohols can be used as mixtures or as specific primary alcohols such as hexyl, octyl, and decyl and may be mixtures of or individual primary alcohols having chain lengths of from about eight to about twenty eight carbon atoms.

Preferred alcohols have a backbone of from 8 to 22 carbon atoms, are monohydric, primary, and unsaturated. Preferred alcohols include mixtures comprising $C_{8-16}$ Oxo process bottoms, both branched and linear.

It should be noted that when the ester is to be sulfated subsequently, it is critical that it be unsaturated or polyunsaturated, so that sulfate moieties may be added. Thus, although either the alcohol or the fatty acid may be saturated, they both cannot be saturated. Moreover, if the sulfated ester is to be used in leather treatment, the preferred total number of carbon atoms is between 20 and 35.

The molar ratio of the ingredients is 1.0 mole of fatty acid for each hydroxy group of the alcohol. Thus, where the alcohol is monohydric, the ratio is 1:1 and where the alcohol is dihydric, the ratio is 1:2. A slight excess of alcohol is preferred, to ensure the absence of any free fatty acid.

Example II

Esters were prepared, all of which were within the scope of this invention, in accordance with the procedure of Example I, using the following ingredients:

| Ester | Fatty acid | Alcohol(s) |
|---|---|---|
| a | Oleic acid (80%) and linoleic acid (20%). | $8_{8-16}$ "Oxo process" bottoms—branched and linear. |
| b | do | $C_{8-16}$ "Oxo process" bottoms—branched and linear (high boiling fraction—above 160° C.). |
| c | Oleic acid (60%) and linoeic acid (40%). | $C_{8-16}$ "Oxo process" bottoms—branched and linear. |
| d | do | $C_{13}$—branched. |
| e | do | $C_8$ (5C%) plus $C_{13}$ (50%)—branched. |
| f | do | $C_8$ (33.3%) plus $C_9$ (33.3%) plus $C_{13}$ (33.3%)—branched. |
| g | do | $C_{6-10}$ (19%) plus $C_{11}$ (6%) plus $C_{12-14}$ (20%) plus $C_{15}$ (55%)—linear. |
| h | Oleic acid (80%) and linoleic acid (20%). | $C_{20-22}$ "ethyl process" bottoms—branched and linear. |
| i | Oleic acid (60%) and linoleic acid (40%). | $C_{8-16}$ "Oxo process" bottoms—branched and linear (90%) and carnauba wax (10%). |
| j | do | $C_{8-16}$ "Oxo process" bottoms—branched and linear (high boiling fraction—above 160° C.). |
| k | do | $C_{8-16}$ "Oxo process" bottoms—branched and linear (low boiling fraction—below 160° C.). |
| l | do | $C_{20-22}$ "ethyl process" bottoms—branched and linear. |

Preparation of the ester/unsaturated oil blends

The ester may be blended with one or more unsaturated oils to form a composition that evidences many of the properties of natural sperm oil. Optionally, an additional (saturated) oil such as mineral oil may be added. Examples of various blends that were prepared include the following:

EXAMPLE III

| Blend | Ester of Example II (percent) | Oil I (percent) | Oil II (percent) | Oil III (percent) |
|---|---|---|---|---|
| a | c. (38.0) | Pecan (52.0) | Paraffin (10.0) | |
| b | c. (33.0) | Pecan (47.0) | Paraffin (20.0) | |
| c | c. (33.3) | Pecan (33.3) | Paraffin (33.3) | |
| d | c. (33.0) | Rice bran (47.0) | Paraffin (20.0) | |
| e | i. (33.0) | Pecan (47.0) | do | |
| f | a. (33.0) | do | do | |
| g | c. (33.0) | do | do | |
| h | c. (40.0) | Pecan (40.0) | do | |
| i | c. (33.0) | Pecan (23.5) | do | Neat's-foot (23.5). |
| j | c. (33.0) | Rice bran (23.5) | do | Do. |
| k | c. (50.0) | Pecan (50.0) | | |
| l | c. (50.0) | Castor (50.0) | | |
| m | c. (33.0) | Neat's-foot (47.0) | Paraffin (20.0) | |
| n | c. (33.0) | Neat's-foot (42.0) | do | Tall oil (5.0). |
| o | c. (33.0) | Neat's-foot (57.0) | Paraffin (10.0) | |
| p | d. (33.0) | Pecan (47.0) | Paraffin (20.0) | |
| q | e. (33.0) | do | do | |
| r | f. (33.0) | do | do | |
| s | g. (33.0) | do | do | |
| t | c. (33.0) | Rapeseed (47.0) | do | |

The esters may constitute from about 20% to about 60% and preferably from about 30% to about 45% of the total blend. If a mineral oil diluent is added, it may constitute from 5% to 40% of the total blend.

Useful unsaturated oils include those having an iodine value of over 60 and include, but are not limited to: vegetable oils such as acorn, almond, apricot kernel, beechnut, black mustard, brazil nut, candlenut, cashew nut shell, castor, chaulmoogra, corn, cottonseed, croton, ergot, grape seed, hazelnut, hemp seed, jute seed, laurel, lemon, linseed, oat, olive, peach kernel, peanut, pecan kernel, perilla, pistachio nut, plum kernel, poppy seed, pumpkin seed, rape seed, rice bran, safflower, sesame, soya, sunflower, tall oil, tung, walnut wheat, and white mustard seed; animal oils such as lard-oil and neat's-foot, and fish oils such as cod liver, dogfish, herring, menhaden, sardine and shark.

Preferred unsaturated oils include those having an iodine value over 90, for example, cod liver, corn, cottonseed, croton, hemp seed, herring, lemon, linseed, peanut, pecan rapeseed, rice bran, safflower, sardine, shark, soya, sunflower and tung.

Saturated hydrocarbon oils may optionally be added as diluents. The presence of such oils is particularly useful if the blend is to be sulfated, as it results in a higher degree of sulfation. This is due to the increased ease with which the sulfate radicals can contact the double bonds of the esters and unsaturated oils in the blends. Useful saturated hydrocarbon oils include mineral oils such as paraffin oil and other petroleum fractions such as kerosene.

Sulfation of the esters

The esters of this invention may be sulfated, or preferably, one or more of the esters of this invention may be blended with one or more unsaturated oils, and the resulting blend may then be sulfated by any conventional method, the method of Example IV being exemplary and preferred.

Example IV (1) A reaction kettle was charged with the following ingredients (all quantities are parts by weight):

| | Parts |
|---|---|
| Unsaturated oil | 47.0 |
| Unsaturated ester | 33.0 |
| Saturated hydrocarbon oil (used as a diluent) | 20.0 |

(2) The mixture was stirred and cooled to 10° C.

(3) 24.0 parts of sulfuric acid (98%) was added over a period of 2 hours, during which the mixture was kept at a temperature of 10–20° C.

(4) When addition of the sulfuric acid was complete, the mixture was stirred for an additional 15 minutes. Then the resulting sulfated reaction product was dropped with minimum stirring into 100.0 parts of a wash liquid consisting of 88.5 parts water and 11.5 parts of equal quantities of solar salt and rock salt. The wash liquid was at a temperature of 20–25° C. and the sulfated reaction product was allowed to stand in the wash water for 45 minutes.

(5) Upon separation after standing, the wash water was discarded and the acid value of the remaining sulfated reaction product was determined to the end point of phenolphthalene and to the end point of the methyl range (1.0 me./g. and 0.85 me./g. respectively).

(6) About 65.0 parts of sodium hydroxide (30° Bé.) was then added to the sulfated reaction mass until a total alkali of 0.1 to 0.2 was obtained.

(7) The sulfated reaction mass was then stored overnight at a temperature of 45° C., after which the total alkali was raised to from 0.8 to 0.9, yielding a pH of 7.5–8 when the mass contained 25% moisture.

Examples of useful sulfating or sulfonating agents include sulfuric acid (98%), sodium acid sulfate, chlorosulfonic acid, sulfur trioxide, oleums containing for 15% to 65% sulfur trioxide, and the like.

Saturated hydrocarbon oils do not have to be present during the sulfation. However, it was discovered that the use of such oils as diluents yields a product with a higher sulfate value. Useful saturated hydrocarbon oils include minerals oils such as paraffin oil, as well as other petroleum fractions such as kerosene. It is critical that these oils be saturated, so that they are not themselves sulfated.

Treatment of leather using the sulfated ester/unsaturated oil blend

Tanning operations tend to deprive hides of their natural oils and they therefore become hard and stiff. It is necessary to replace these natural oils in the leather in order to soften it. This is accomplished by placing the hides in a drum and tumbling them in oil-in-water emulsions. Such emulsions are known as fat liquors.

Some of the sulfated ester/unsaturated oil blends of this invention may be used in fat liquors. When used in leather treatment, the maximum total number of carbon atoms in any ester should be between 20 and 35. A lower number may not permit proper penetration of the leather, a higher number may give rise to spue.

The compositions of this invention are useful in treating leathers from many sources, including cowhides, calfskins, goatskins, sheepskins, horsehides, deerskins, and reptile skins. They may be used regardless of how the leathers were treated previously, whether pickled, limed, chrome-tanned or vegetable-tanned, and whether split hides or sides.

The compositions of this invention may be substituted for sulfated sperm oil in any formulation used in the fat liquoring of leather, or may be used by themselves. When used in a formulation with mineral oil, the compositions can carry over 60% mineral oil and up to the amount carried by sulfated natural sperm oil. Not only do the compositions of this invention equal the properties of sulfated sperm oil, in many qualities they surpass it. Thus, these compositions impart to leather more softness, more surface feel, more intense dye color, greater tensile strength, more light fastness, greater resistance to oxidation, and increased ability to carry raw oils (where desired). One part of these compositions can carry up to four parts of mineral oil.

Compositions of this invention were successfully substituted for sulfated natural sperm oil contained in many commercial fat liquor/emulsifier blends including:

(a) A cationic-nonionic-anionic emulsified moellen degras oil containing 10% moisture and about 2% $SO_3$, as well as some neat's-foot oil for added grain lubrication;

(b) A cationic-nonionic-anionic emulsified paste containing 10% moisture and about 2% $SO_3$ as well as some neat's-foot and hydrogenated vegetable oils, used for stuffing in aqueous medium;

(c) A cationic-nonionic-anionic emulsified rice bran oil containing 10% moisture and about 2% $SO_3$, suitable for white leathers as well as colored;

(d) A cationic-nonionic-anionic blend of neat's-foot, cod, and mineral oil containing 12% moisture, suitable for strap and belt leather;

(e) A coconut oil blend containing 30% moisture and about 4.5% $SO_3$;

(f) A paste type blend containing neat's-foot, and fish oils and raw oils such as moellen degras and wool grease, having a 25% moisture content, which imparts a very full mellow feel to the leather;

(g) A mineral oil blend containing 6% moisture suitable for use on vegetable-tanned splits;

(h) A vegetable oil blend containing 25% moisture and about 5.5% $SO_3$ which is particularly non-oxidizing and designed to give softness and surface lubrication to all types of leather, including white;

(i) A blend of fish and moellen oils containing 25% moisture designed to give a full, mellow feel to vegetable tanned leather; and (j) A blend of mineral oils and wool grease containing 15% moisture suitable as a complete fat liquor for splits.

All of the above blends, as well as others not listed, performed equal to or better than the corresponding blends containing sulfated natural sperm oil.

There are innumerable variations in processes for the fat liquoring of leathers, of which the following which were utilized by the inventors are exemplary.

Example V (1) The stock (chrome-tanned leather) was washed in an experimental tumbler for 10 minutes at 37–38° C. so as to remove excess chrome salts and drained.

(2) The stock was neutralized by running in a 100% float containing 0.25% sodium bicarbonate (pH=4.0) for 45 minutes at 37–38° C. and drained.

(3) The stock was washed in a long float at about 49° C. for 10 minutes and drained so as to remove the remaining chrome salts as well as salts resulting from the neutralization step.

(4) The stock was treated with 5–10% fat liquor in a 100% float at about 49° C. and run for from ½ hour to full take-up of the fat liquor (about 1½ hours).

(5) The stock was pulled and horsed to drain overnight.

Example VI (1) The stock was washed in an experimental tumbler for 10 minutes at 37–38° C. and then put into a long float.

(2) The stock was run in a 100% float containing a vegetable retan (such as 10% spray dried wattle extract powder) at a temperature of 37–38° C. and a pH of 3.4 for 1 hour and drained.

(3) The vegetable retanned stock was washed for 10 minutes at a temperature of 49° C. and drained.

(4) The stock was treated with about 5% fat liquor in a 100% float at about 49° C. and run for about 45 minutes by which time there was full take-up of the fat liquor.

(5) The stock was pulled and horsed to drain overnight.

Testing of the efficacy of the blends of Example III after sulfation as fat liquors using the above methods was performed with the following results.

Example VII

| Sulfated blend of Example III (percent of sulfate): | Comparison to quality of leather fat liquored with sulfated natural sperm oil blends |
|---|---|
| (a) (6.0) | Excellent. |
| (b) (7.2) | Excellent. |
| (c) (6.4) | Excellent. |
| (d) (6.5) | Excellent. |
| (e) (6.8) | Excellent. |
| (f) (7.0) | Excellent. |
| (g) (6.5) | Excellent. |
| (h) | Good. |
| (i) | Good. |
| (j) | Good. |
| (k) | Fair (poor sulfation). |
| (l) | Fair (poor sulfation). |
| (m) | Fair (poor sulfation). |
| (n) | Fair (poor sulfation). |
| (o) | Fair (poor sulfation). |
| (p) | Excellent. |
| (q) | Excellent. |
| (r) | Excellent. |
| (s) | Excellent. |
| (t) | Excellent. |

A study of the above results shows that 5 out of the 8 sulfated blends that were only "good" or "fair," contained neat's-foot oil. This indicates that an oil which is relatively saturated (neat's-foot oil has an iodine value of 67–73) is not as good as one which is more unsaturated, presumably because it sulfates to a lower degree. 2 out of the remaining 3 sulfated blends that were only "good" or "fair" contained no mineral oil diluent. Moreover, these two contained pecan oil and castor oil, with relatively low iodine values of 100 and 81–91 respectively. It therefore may be presumed that these also sulfated to a lower degree.

From the above, it may be concluded that for the purposes of leather treatment, the use of relatively unsaturated oils and/or a mineral oil diluent yields compositions which have higher sulfate values and are therefore preferred, although compositions with slightly lower sulfate values are also utilizable. The minimum sulfate value for a utilizable composition is about 4.0% and the maximum practical value is about 11%. Values in the range of 5.5% to 9% are preferred. When a fat liquor is desired with a lower sulfate value, the sulfated blend may be diluted with raw oils and/or further mineral oils. If desired, the sulfated blend may constitute the entire fat liquor.

It has also been discovered that the sulfated blends of this invention may be used as a dressing for finished leather products such as boots. When so used, the sulfated blends may be used by themselves, or further blended with raw oils and/or waxes and/or dyes.

Treatment of leahter using the unsulfated ester/unsaturated oil blend

The unsulfated blend has various uses in leather. When used as a raw oil replacement in a fat-liquor composition, the leather treated therewith showed superior qualities, and particularly improved surface feel. The unsulfated blend may also be used without additional ingredients in "oiling off" leather. This is a process whereby leather is first dampened slightly and the blend is then applied to the surface. This yields a leather having greater grain strength (reduced cracking) and added surface feel.

We claim:

1. A composition consisting essentially of a sulfated blend of:
    (A) from about 20% to about 60% of the total weight of an ester which is the reaction product of
        (1) at least one fatty acid having a backbone of from 2 to 28 carbon atoms which may be saturated or unsaturated, branched or linear, substituted or unsubstituted and monocarboxylic or dicarboxylic, and
        (2) at least one aliphatic alcohol having a backbone of from 2 to 30 carbon atoms which may be saturated or unsaturated, branched or linear, monohydric or dihydric, and primary, secondary, or tertiary, with the provisos that the molar ratios of the reactants are about 1.0 mole of fatty acid for each hydroxy group of the alcohol, and that at least one of the above reactants is unsaturated; and
    (B) at least one unsaturated oil selected from the group consisting of vegetable oils, animal oils excluding sperm oil, and fish oils.

2. The composition of claim 1 in which from about 5% to about 40% of a mineral oil diluent is added to the blend prior to sulfation.

3. The composition of claim 1 in which: (a) the fatty acids have a backbone of from 6 to 22 carbon atoms, and are unsaturated and monocarboxylic; (b) the aliphatic alcohols have a backbone of from 8 to 22 carbon atoms, and are monohydric, primary, and unsaturated; and (c) the unsaturated oils are vegetable oils or fish oils, each having an iodine value of over 90.

4. The composition of claim 3 in which: (a) the fatty acid is a blend of oleic and linoleic acids; (b) the aliphatic alcohol is a mixture of $C_{8-16}$ Oxo process bottoms, both branched and linear; and (c) the unsaturated oil is pecan, rice bran, rapeseed, or a mixture thereof.

5. The composition of claim 4 in which the ester is about 33% of the blend, the unsaturated oil is about 47% of the blend, a mineral oil diluent is present and is about 20% of the blend, and the resulting mixture of the blend and diluent is sulfated.

6. A process of dressing finished leather comprising applying the composition of claim 1 to the surface of the leather.

7. A process of fat liquoring leather comprising applying a fat liquor containing up to 100% of the composition of claim 1 to the leather.

8. Leather treated with the composition of claim 1.

References Cited

UNITED STATES PATENTS

| 3,485,573 | 12/1969 | Heydon | 117—142 |
| 2,585,053 | 2/1952 | Kent | 106—247 |
| 3,300,525 | 1/1967 | Plapper | 8—94.22 |
| 2,892,673 | 6/1959 | Heydon et al. | 8—94.22 |
| 2,974,000 | 3/1961 | Retzsch | 8—94.23 |
| 2,644,825 | 7/1953 | Beretvas | 260—399 |

THEODORE MORRIS, Primary Examiner

U.S. Cl. X.R.

8—94.22; 106—265; 117—142

UNITED STATES PATENT AND TRADEMARK OFFICE
CERTIFICATE OF CORRECTION

PATENT NO. : 3,764,358
DATED : October 9, 1973
INVENTOR(S) : John G. Papalos and Clinton E. Retzsch It is certified that error appears in the above-identified patent and that said Letters Patent are hereby corrected as shown below:

Column 2, line 24, "acid" should be --aid--. Column 3, line 18, "tridecy" should be --tridecyl--; column 3, line 20, "produce" should be --produced--; column 3, Example II, line 53, under heading "Alcohol(s)", "$8_{8-16}$" should be --$C_{8-16}$--; column 3, Example II, line 59, under heading "Alcohol(s)", "(5C%)" should be --(50%)--. Column 7, line 57, "leahter" should be --leather--.

$\mathfrak{Signed\ and\ Sealed\ this}$

Eighteenth $\mathfrak{Day\ of}$ January 1977

[SEAL]

Attest:

RUTH C. MASON
*Attesting Officer*

C. MARSHALL DANN
*Commissioner of Patents and Trademarks*